Sept. 4, 1928.　　　　　O. S. PENN　　　　　1,683,407

ENDLESS TRACK VEHICLE

Filed Feb. 1, 1924　　　3 Sheets-Sheet 1

Inventor
Oscar S. Penn
By his attorneys
Baldwin Wight

Sept. 4, 1928.  
O. S. PENN  
ENDLESS TRACK VEHICLE  
Filed Feb. 1, 1924
1,683,407
3 Sheets-Sheet 2
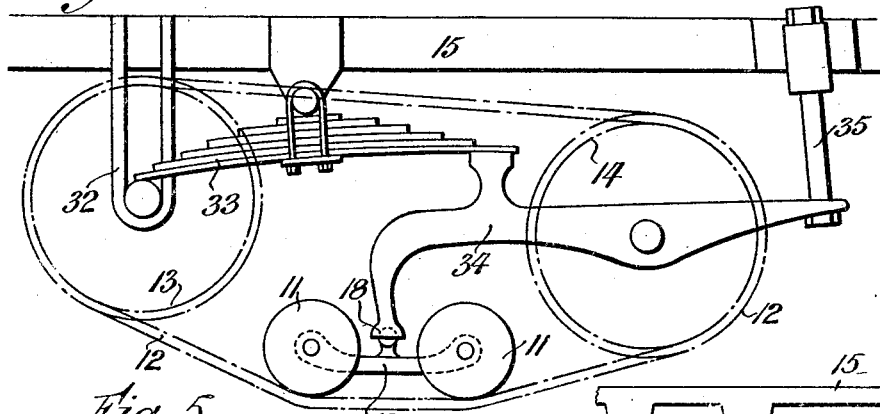
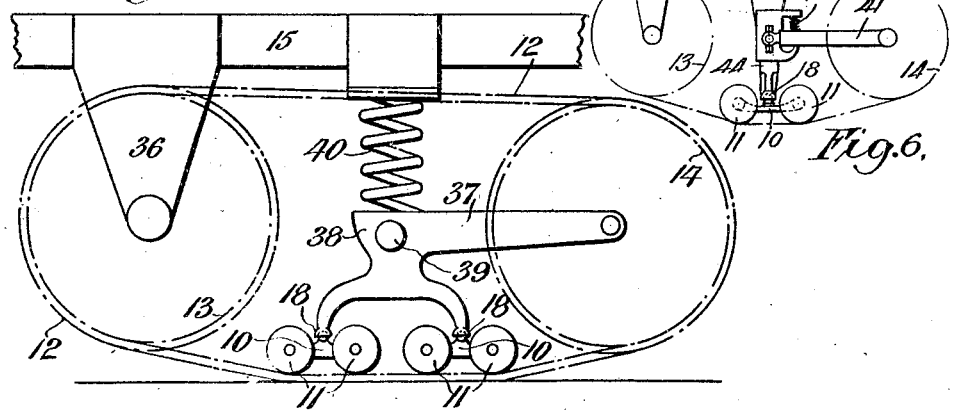
Inventor
Oscar S. Penn,
By his attorneys,
Baldwin Wight

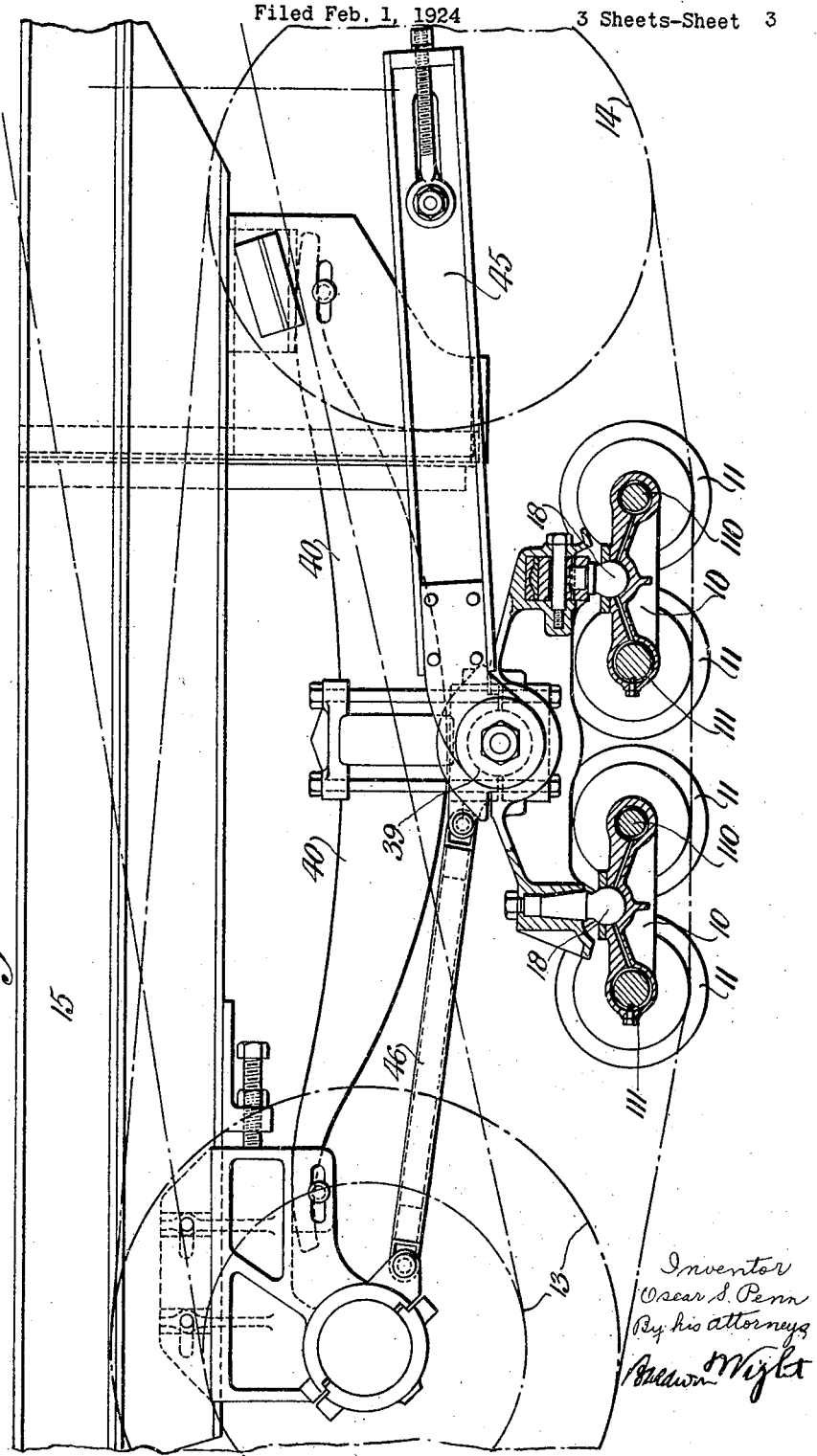

Patented Sept. 4, 1928.

1,683,407

UNITED STATES PATENT OFFICE.

OSCAR STYLES PENN, OF WANDSWORTH COMMON, LONDON, ENGLAND, ASSIGNOR TO ROADLESS TRACTION, LIMITED, OF HOUNSLOW, MIDDLESEX, ENGLAND.

ENDLESS-TRACK VEHICLE.

Application filed February 1, 1924, Serial No. 689,079, and in Great Britain February 9, 1923.

This invention relates to endless track vehicles and particularly to vehicles in which the endless track is a short one as in a half track vehicle, but in all cases the invention may be applied to vehicles requiring a longer track by increasing the number of bogies or rollers which support the weight of the vehicle. The endless track which is laterally flexible is carried by two wheels, either a driven sprocket wheel and an idler or two idler wheels which may or may not be provided with teeth as desired. Neither the sprocket wheel nor the idlers are normally in contact with the ground.

According to this invention bogie frames having two or more rollers are employed, the rollers either being arranged in pairs or tandem whilst in cases in which the weight to be carried is not excessive single rollers may be employed instead of bogies. The bogie frames are mounted so as to allow of universal movement. In the first arrangement the rollers are mounted either on the spindles in the usual manner or one or both sets of rollers are connected to the bogie frames by universal joints or both sets are connected to the bogie frames by longitudinal pin joints. In the latter arrangement one set of rollers is connected to the bogie frame by a universal joint or by a longitudinal pin joint whilst the other set is mounted on the spindle in the usual manner.

According to this invention also the sprocket wheel or one of the idlers is connected either rigidly or flexibly to the chassis while the other idler may be mounted on the end of the arm pivoted either to the chassis or to the bogie mounting. Alternatively the idler may be mounted on an arm rigidly connected to or forming part of the bogie mounting. The movements of an idler and its corresponding bogie mounting is in some cases limited by the same spring which spring may also spring the driving or sprocket wheel.

In these arrangements any of the mountings before described for the rollers or bogies may be employed and springs may be substituted for the arms or levers carrying the wheels, and the arms or levers may be double or single.

Figures 3, 4, 5 and 6 are side elevations of modified forms of the invention, and Figure 7 is a side elevation with parts in section, of a further modified form.

Figure 1:
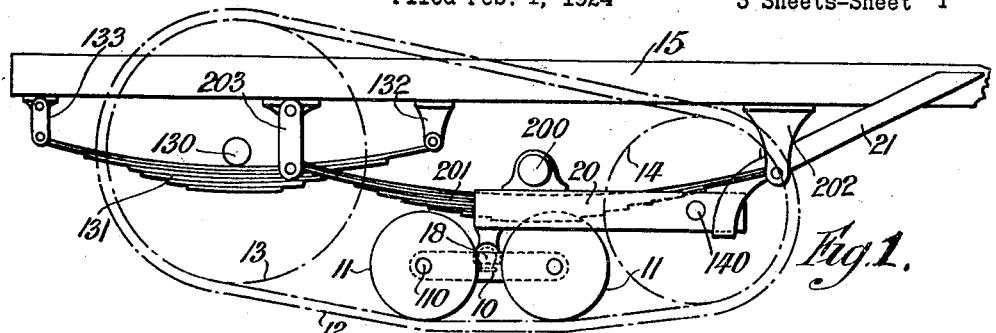
Figure 1 is a side elevation of an endless track arrangement embodying my invention.

In all the figures 10 is a bogie frame supported on two or four rollers 11 which carry the weight of the vehicle and run on a track 12. The track 12 is carried on sprocket wheels 13, 14, the sprocket wheel 13 being driven and mounted on the chassis 15, the idler sprocket wheel 14 being mounted as hereinafter described.

Figure 2:
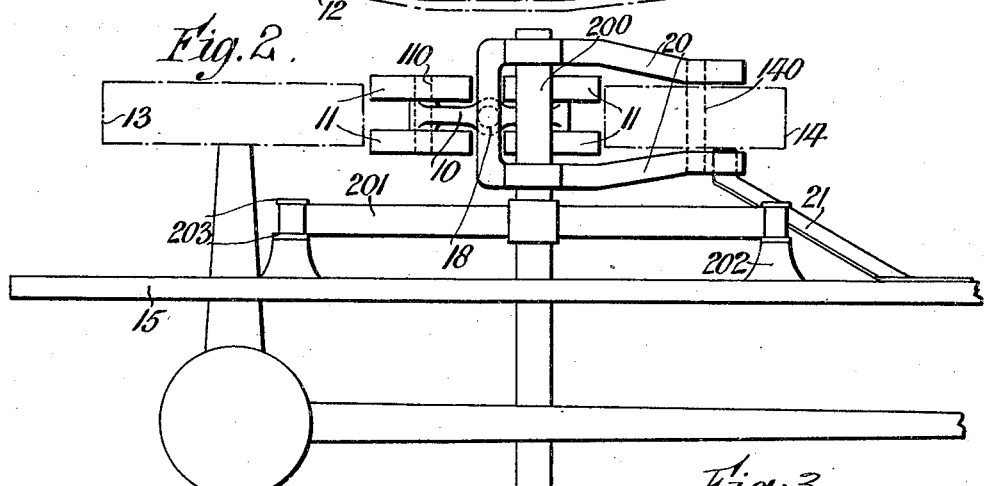
Figure 2 is a plan view of the parts of Figure 1.

In the arrangement shown in Figures 1 and 2, the sprocket wheel 13 is mounted on a shaft 130 carried by a laminated spring 131, one end being secured to a bracket 132 fixed to the chassis 15 and the other end to a link 133 pivoted to the chassis. The bogie frame 10 is mounted on a universal joint 18 at the end of one arm of a double bell crank lever mounted on a pivot 200 carried by a laminated spring 201 one end of which is secured to a bracket 202 fixed to the chassis whilst the other end is secured to a link 203 pivoted to the chassis. The idler sprocket wheel 14 is mounted on an axis 140 carried by the other ends of the bell crank lever 20. 21 is a bar having a flange at its end which engages the end of the bell crank lever 20 and limits its downward motion.

Figure 3:
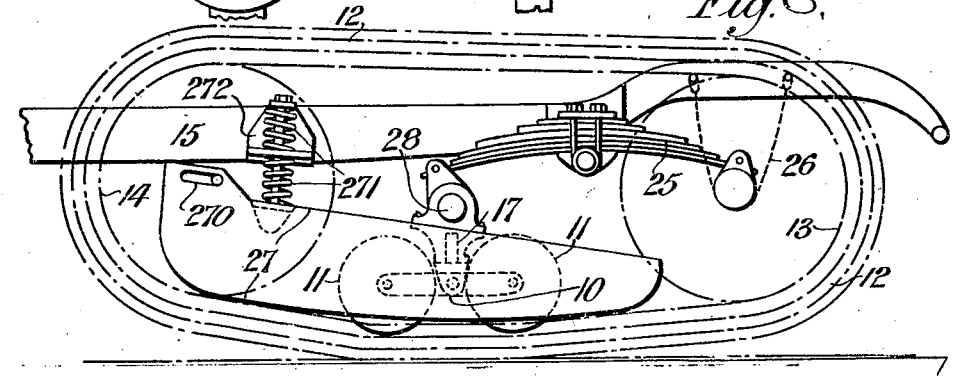

In the arrangement shown in Figure 3, the sprocket wheel 13 is mounted on one end of a laminated spring 25 fixed to the chassis and chains 26 are provided to limit the downward motion of the sprocket wheel 13. The axis of the idler 14 extends into slots 270 in arms 27 whose upward and downward movement is limited by springs 271 acting on each side of a bracket 272. The bogie frame 10 is mounted on a vertical pivot 17 in a bearing 28 secured to the end of the laminated spring 25.

In figure 4 the axis of the sprocket wheel 13 is slidably held in bearings 32 by a laminated spring 33 fixed to the chassis 15. The spring 33 also engages with a lever 34 on whose downwardly turned end is a spherical bearing engaging with a sphere 18 on the bogie frame 10. To the other end of the lever is rotatably mounted the idler 14, the extreme end of the lever 34 embracing a guide 35 fixed to the chassis 15.

In Figure 5 the sprocket wheel 13 is rotatably mounted in a bracket 36 fixed to the chassis 15 whilst the idler 14 is rotatably mounted on an arm 37 forming part of the bogie mounting 38 which is pivoted to a shaft 39, a spring 40 being mounted between the top of the mounting and the chassis 15. In this case the mounting 38 is supported on universal joints 18 on two bogie frames 10.

In the arrangement shown in Figure 6 the driving sprocket 13 is carried by a bracket 36 on the chassis and the idler 14 is carried by an arm 41 pivoted to a bracket 42, its movement being controlled by a spring 43. The bogie frame 10 is carried by a universal joint 18 in a bearing 44 which is a spring box carried by the bracket 42.

Figure 7 shows a modification similar to that disclosed in Figure 5, the driving sprocket 13 being fixed to the chassis whilst the idler 14 is carried at the end of an arm 45 pivoted to a shaft 39 carried by a spring 40 which spring is slidably mounted at both ends on the chassis. An eight wheeled bogie is pivoted to the shaft 39 the whole being positioned in relationship to the chassis by radius rod 46. The wheels of the bogies are mounted on shafts 110, one of which is mounted in a universal bearing 111 whilst both frames have universal joints. The forward bogie is capable of moving bodily sideways whilst the rear bogie is not (see Patent No. 1,515,167).

It will be observed that in the arrangement shown in Figure 3 one spring acts as a flexible connection between the driving sprocket wheel 13 and the chassis and the bogie mounting and the chassis. If the spring and the connection between it and the bogie mounting is carried more forward than shown in the drawing the spring will also act as a flexible connection between the idler 14 and the chassis.

What I claim is:—

1. In endless track vehicles, the combination of laterally flexible tracks, universally mounted bogies having wheels which run thereon, and supporting means for said tracks comprising two wheels, both the wheels and the portion of the track directly beneath them being normally out of contact with the ground, one of said wheels being a driving wheel for the track and the other an idler, and a spring connected to the chassis and the bogie mounting and also supporting one of said wheels.

2. In endless track vehicles, the combination of laterally flexible tracks, universally mounted bogies having wheels which run thereon, and supporting means for said tracks comprising two wheels, both the wheels and the portion of the track directly beneath them being normally out of contact with the ground, one of said wheels being a driving wheel for the track and the other an idler, and a spring connected to the chassis and the bogie mounting and also supporting the idler wheel.

3. In endless track vehicles, the combination of laterally flexible tracks, universally mounted bogies having wheels which run thereon, and supporting means for said tracks comprising two wheels, both the wheels and the portion of the track directly beneath them being normally out of contact with the ground, one of said wheels being a driving wheel for the track and the other an idler, and a spring connected to the chassis and the bogie mounting, supporting the idler wheel and also yieldingly positioning the driving wheel.

In testimony that I claim the foregoing as my invention I have signed my name this 9th day of January, 1924.

OSCAR STYLES PENN.